US011664911B2

(12) United States Patent
Lorman

(10) Patent No.: US 11,664,911 B2
(45) Date of Patent: May 30, 2023

(54) PORTABLE SENSOR FUSION BROADCAST SYSTEM FOR MARITIME SITUATIONAL AWARENESS

(71) Applicant: ThayerMahan, Inc., Groton, CT (US)

(72) Inventor: Alexander Lorman, Mystic, CT (US)

(73) Assignee: THAYERMAHAN, INC., Groton, CT (US)

( * ) Notice: Subject to any disclaimer, the term of this patent is extended or adjusted under 35 U.S.C. 154(b) by 27 days.

(21) Appl. No.: 16/891,432

(22) Filed: Jun. 3, 2020

(65) Prior Publication Data

US 2020/0389240 A1 Dec. 10, 2020

Related U.S. Application Data

(60) Provisional application No. 62/857,211, filed on Jun. 4, 2019.

(51) Int. Cl.
*H04H 40/00* (2009.01)
*H04H 20/22* (2008.01)
*H04Q 9/00* (2006.01)
*H04L 12/10* (2006.01)
*H04L 67/55* (2022.01)

(52) U.S. Cl.
CPC ............. *H04H 20/22* (2013.01); *H04L 12/10* (2013.01); *H04L 67/55* (2022.05); *H04Q 9/00* (2013.01); *H04Q 2213/003* (2013.01)

(58) Field of Classification Search
CPC ........ H04H 20/22; H04H 20/86; H04L 12/10; H04L 67/26; H04L 67/55; H04L 67/12; H04L 69/18; H04Q 9/00; H04Q 2213/003; H04Q 2209/40; H04Q 2209/50; H04Q 2209/60; H04W 4/06; H04W 4/38
See application file for complete search history.

(56) References Cited

U.S. PATENT DOCUMENTS

| | | | | |
|---|---|---|---|---|
| 5,230,087 A | * | 7/1993 | Meyer | H04B 17/20 455/226.4 |
| 5,311,541 A | * | 5/1994 | Sanderford, Jr. | H04J 13/00 380/34 |
| 5,393,713 A | * | 2/1995 | Schwob | H04H 60/74 455/158.5 |
| 5,483,684 A | * | 1/1996 | Ono | H03J 1/005 455/168.1 |
| 5,513,385 A | * | 4/1996 | Tanaka | H04H 60/47 455/228 |
| 5,548,809 A | * | 8/1996 | Lemson | H04W 16/14 455/454 |
| 6,134,445 A | * | 10/2000 | Gould | H04B 17/318 455/158.5 |
| 6,265,861 B1 | * | 7/2001 | Musha | G01R 23/173 324/76.23 |
| 6,316,928 B1 | * | 11/2001 | Miyauchi | G01R 23/167 324/76.27 |

(Continued)

FOREIGN PATENT DOCUMENTS

WO WO-2013012516 A1 1/2013

*Primary Examiner* — Stephen M D Agosta
(74) *Attorney, Agent, or Firm* — Wilson Sonsini Goodrich & Rosati

(57) ABSTRACT

Described are portable sensor fusion broadcast systems and devices including a communications module, a sensor fusion module, and a broadcast module.

40 Claims, 3 Drawing Sheets

Major system overview showing modules.

(56) References Cited

U.S. PATENT DOCUMENTS

| | | | | |
|---|---|---|---|---|
| 6,418,162 B1* | 7/2002 | Yau | H04B 17/309 |
| | | | 375/295 |
| 7,116,943 B2* | 10/2006 | Sugar | H04L 1/1664 |
| | | | 455/67.11 |
| 7,724,851 B2* | 5/2010 | Learned | H04B 1/7105 |
| | | | 455/303 |
| 8,055,204 B2* | 11/2011 | Livsics | H04B 17/345 |
| | | | 455/67.11 |
| 8,125,213 B2* | 2/2012 | Goguillon | H03J 1/0083 |
| | | | 324/76.19 |
| 8,589,003 B2 | 11/2013 | Brand et al. | |
| 8,750,156 B1* | 6/2014 | Carbajal | H04W 48/16 |
| | | | 370/252 |
| 8,787,836 B1* | 7/2014 | Carbajal | H04W 24/08 |
| | | | 455/67.11 |
| 8,874,044 B1* | 10/2014 | Carbajal | H04W 24/08 |
| | | | 455/67.11 |
| 9,451,020 B2 | 9/2016 | Liu et al. | |
| 10,187,841 B1* | 1/2019 | Muthuswamy | H04W 36/30 |
| 2002/0112196 A1* | 8/2002 | Datta | H04L 41/042 |
| | | | 714/4.11 |
| 2004/0023674 A1* | 2/2004 | Miller | H04L 27/0012 |
| | | | 455/445 |
| 2004/0028123 A1* | 2/2004 | Sugar | H04L 1/1664 |
| | | | 375/224 |
| 2004/0253952 A1* | 12/2004 | Rager | H04W 48/16 |
| | | | 455/432.1 |
| 2005/0192031 A1* | 9/2005 | Vare | H04W 36/32 |
| | | | 455/456.6 |
| 2006/0009216 A1* | 1/2006 | Welnick | H04W 48/16 |
| | | | 455/434 |
| 2006/0212909 A1* | 9/2006 | Girard | H01Q 21/061 |
| | | | 725/76 |
| 2007/0233409 A1* | 10/2007 | Boyan | G01R 23/16 |
| | | | 702/57 |
| 2008/0211481 A1* | 9/2008 | Chen | H03J 1/0091 |
| | | | 324/76.22 |
| 2009/0047920 A1* | 2/2009 | Livsics | H04B 1/719 |
| | | | 455/226.1 |
| 2009/0147690 A1* | 6/2009 | King | H04L 45/28 |
| | | | 370/245 |
| 2009/0215443 A1* | 8/2009 | Dickey | H04W 24/08 |
| | | | 455/424 |
| 2011/0270475 A1 | 11/2011 | Brand et al. | |
| 2012/0072986 A1* | 3/2012 | Livsics | H04W 24/04 |
| | | | 726/22 |
| 2014/0204954 A1* | 7/2014 | Nee | H04L 47/2441 |
| | | | 370/401 |
| 2014/0274177 A1* | 9/2014 | Carbajal | H04W 72/0446 |
| | | | 455/501 |
| 2014/0323058 A1* | 10/2014 | Carbajal | H04W 48/16 |
| | | | 455/67.11 |
| 2015/0133058 A1* | 5/2015 | Livis | H04B 17/391 |
| | | | 455/67.11 |
| 2016/0021178 A1 | 1/2016 | Liu et al. | |
| 2016/0097840 A1* | 4/2016 | Culkin | G01S 13/325 |
| | | | 342/195 |
| 2016/0119806 A1* | 4/2016 | Carbajal | H04W 72/51 |
| | | | 455/67.11 |
| 2017/0300654 A1* | 10/2017 | Stein | H01Q 21/24 |
| 2018/0324595 A1* | 11/2018 | Shima | H04W 16/14 |
| 2018/0331863 A1* | 11/2018 | Carbajal | G01S 5/02 |
| 2021/0075654 A1* | 3/2021 | Carbajal | G01S 5/02 |

\* cited by examiner

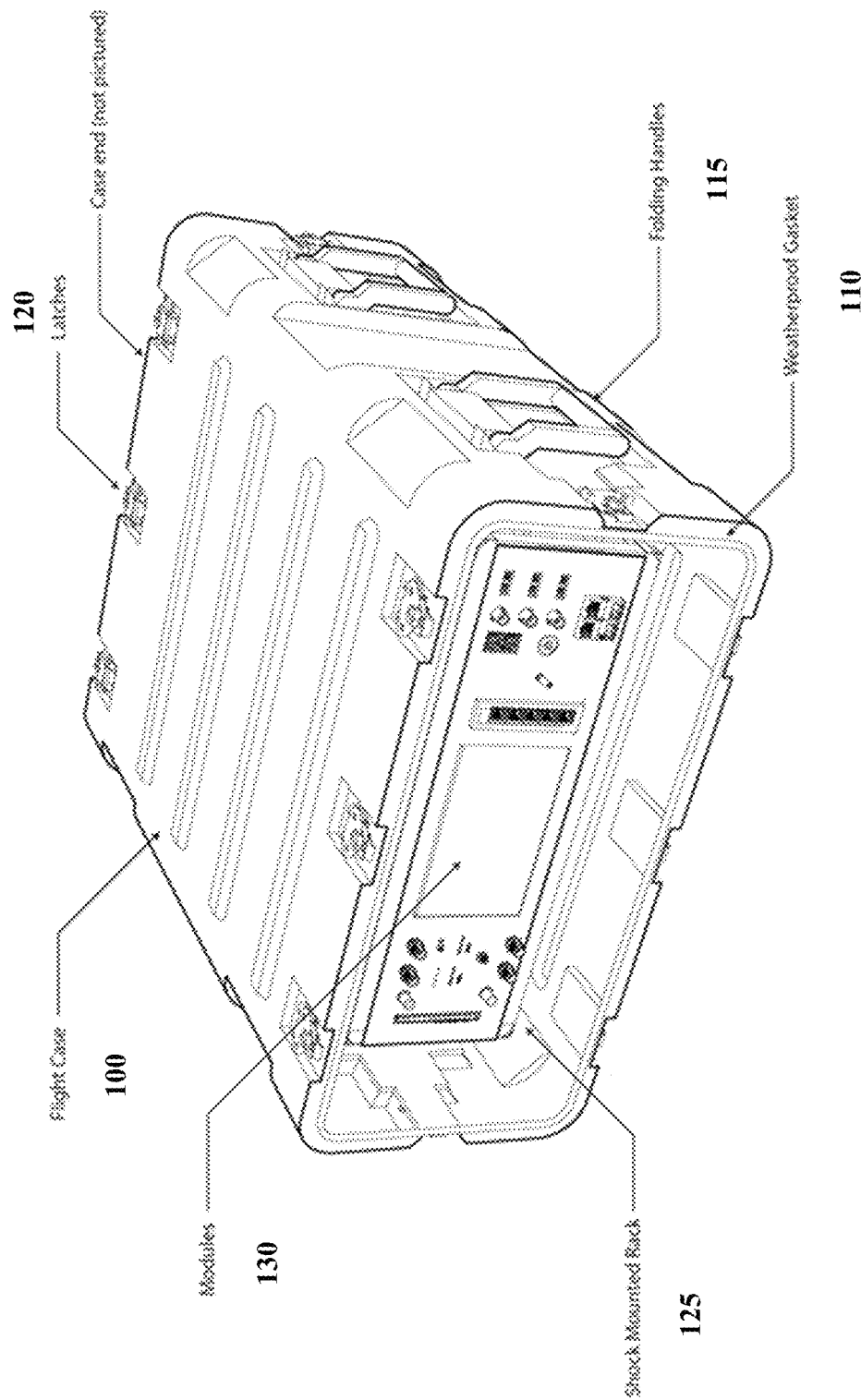
Fig. 1: The system showing major components.

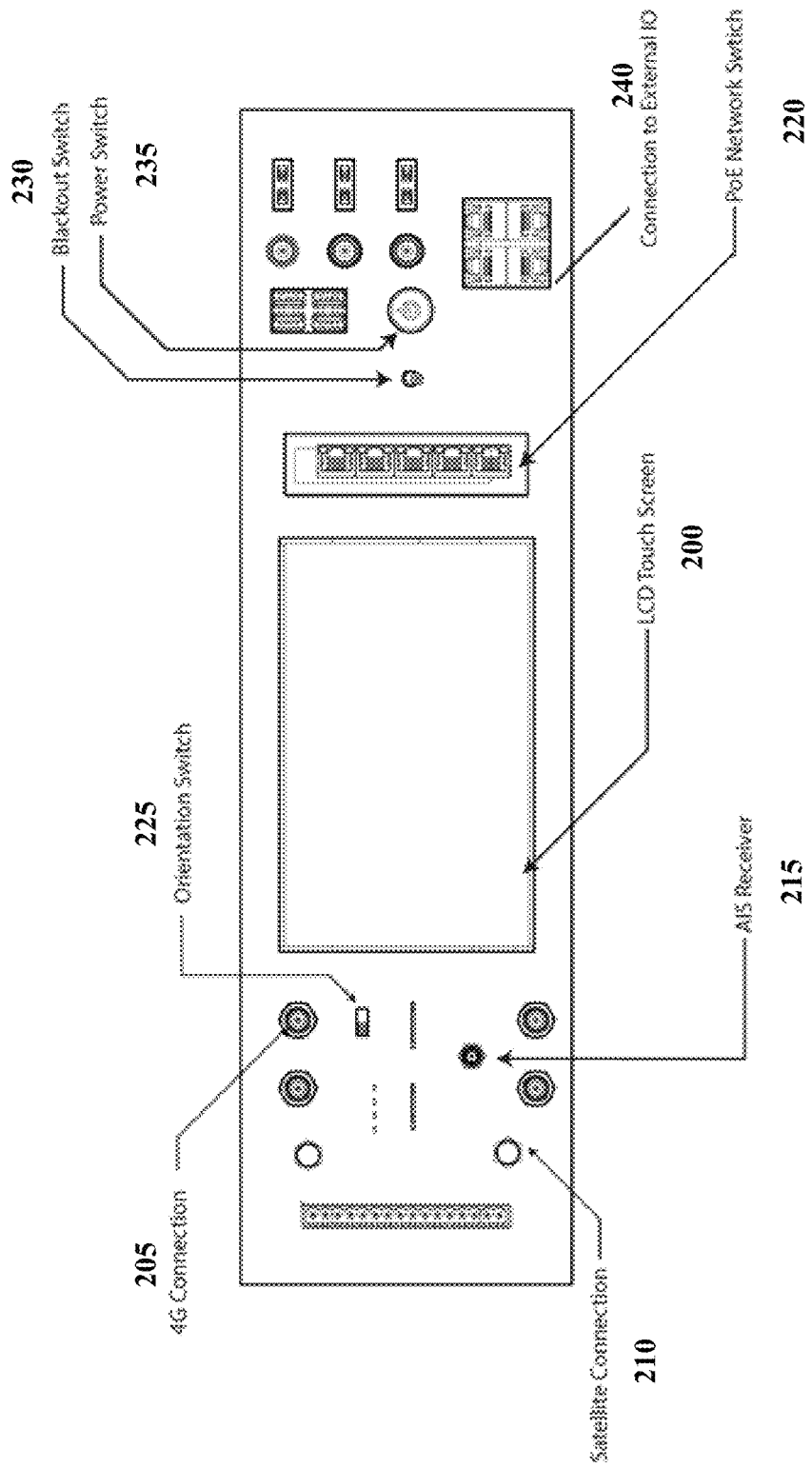
Fig. 2: Detail of front panel showing major connections.

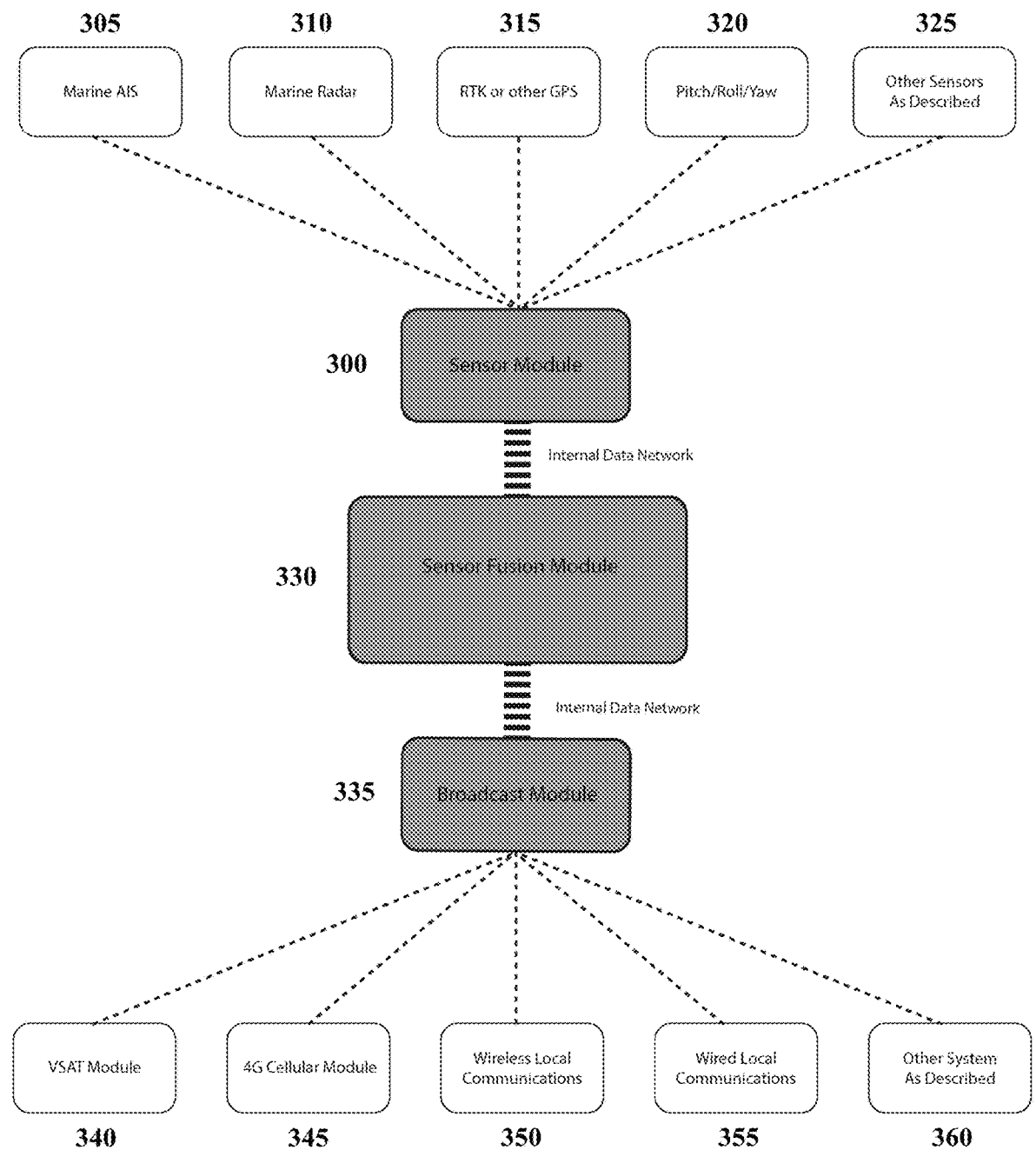
Fig. 3: Major system overview showing modules.

PORTABLE SENSOR FUSION BROADCAST SYSTEM FOR MARITIME SITUATIONAL AWARENESS

CROSS-REFERENCE TO RELATED APPLICATIONS

This application claims the benefit of U.S. Application No. 62/857,211, filed on Jun. 4, 2019, entitled "PORTABLE SENSOR FUSION BROADCAST SYSTEM FOR MARITIME SITUATIONAL AWARENESS," the contents of which are incorporated herein by reference for all purposes.

BACKGROUND

Communication of sensor data in austere and remote environments is often required for military, paramilitary, emergency, research, and aid operations. While specific remote communications devices have been designed for optimized performance, no single communications method is reliably available worldwide.

SUMMARY

Specific remote communications devices have been designed for optimized performance. However, as no single communications method is reliably available worldwide, such systems are often vulnerable to lapses in contact and limited bandwidth. As such, provided herein are systems and devices configured to receive data.

In one aspect, disclosed herein are portable sensor fusion broadcast systems comprising: a case; a display disposed in the case; a communications module disposed in the case and configured to: identify and connect to any of a plurality of communications channels comprising: very small aperture terminal (VSAT) satellite links, cellular networks, serial links, and internet protocol (IP)-based networks; and conduct an automated prioritized failover procedure when the performance of one or more of the communications channels falls below a threshold; a sensor fusion module disposed in the case and configured to: receive sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; log the sensor data in a non-volatile data store; and conduct signal synthesis processing to generate a fused sensor data output; and a broadcast module disposed in the case and configured to broadcast the sensor data, the fused sensor data output, or both to one or more local or remote push or pull clients through one or more of: the display, a wired connection, and the communications module. In some embodiments, the case is a flight case. In further embodiments, the flight case is a rolling flight case. In a particular embodiment, the case is one-person portable. In some embodiments, the case is weather-resistant and water-resistant. In some embodiments, the case comprises internal shock mounts. In further embodiments, the case comprises an electronic component rack affixed to the shock mounts and the communications module, the sensor fusion module, and the broadcast module are mountable to the rack. In some embodiments, the system further comprises an external VSAT antenna. In further embodiments, the system further comprises an external azimuthing antenna. In further embodiments, the system further comprises an external phased array antenna. In some embodiments, the system further comprises more than one VSAT antenna and utilizes logic to load balance between the multiple antennas. In some embodiments, the system further comprises one or more external cellular antennas. In some embodiments, the system further comprises one or more external GPS antennas. In some embodiments, the system further comprises an external radar antenna. In further embodiments, the system further comprises a module disposed in the case and configured to perform automatic target recognition (ATR) of the radar data. In some embodiments, the display is a color display. In some embodiments, the display is a touch screen. In some embodiments, the display is an e-ink style display. In some embodiments, the system further comprises a software defined radio (SDR) connected to one or more suitable external antennas. In some embodiments, the system further comprises one or more radio frequency (RF) direction finding systems or modules disposed in the case and configured to intercept, direction find, and record existent RF signals of varying bands. In further embodiments, the system further comprises one or more suitable antennas for the one or more RF direction finding systems or modules. In some embodiments, the system further comprises a cellular broadcast system or module disposed in the case and configured to broadcast a cellular network and allow cellular devices in range to connect. In further embodiments, the system further comprises one or more suitable antennas for the cellular broadcast system or module. In some embodiments, the system further comprises an Automatic Information System (AIS) broadcasting module configured to broadcast marine AIS messages of arbitrary and changeable nature. In further embodiments, the system further comprises one or more antennas suitable for the AIS broadcasting module. In further embodiments, the system further comprises electronic or physical logic to prevent the simultaneous transmission and reception of AIS messages between modules. In some embodiments, the system further comprises one or more external power connections configured to interface to available AC or DC power and provide conversion and/or conditioning to make use of such power. In some embodiments, the system further comprises an uninterruptible power supply (UPS) disposed in the case and supplying power to the display, the communications module, the sensor fusion module, and the broadcast module. In some embodiments, the system further comprises an inertial measurement unit (IMU) disposed in the case. In some embodiments, the system further comprises a rate gyro disposed in the case. In some embodiments, the GPS data comprises single antenna-aided position or dual-antenna RTK position. In some embodiments, the GPS data comprises RTK moving-baseline data from which a heading is be computed. In some embodiments, the system further comprises a power over Ethernet (PoE) supply system disposed in the case. In some embodiments, the system further comprises a network switch disposed in the case and configured to provide power over Ethernet (PoE). In some embodiments, the automated failover procedure is prioritized according to predetermined communications channel attributes. In some embodiments, the one or more vehicles comprise at least one maritime vehicle. In further embodiments, the at least one maritime vehicle comprises one or more unmanned maritime vehicles. In other embodiments, the at least one maritime vehicle comprises one or more manned maritime vehicles. In some embodiments, the one or more vehicles comprise at least one air vehicle. In further embodiments, the at least one air vehicle comprises one or more unmanned air vehicles. In other embodiments, the at least one air vehicle comprises one or more manned air vehicles. In some embodiments, the one or more vehicles comprise at least one terrestrial ground vehicle. In further embodiments, the at least one terrestrial ground vehicle comprises one or more unmanned terrestrial ground vehicles. In other embodiments, the at least one terrestrial ground vehicle comprises one or more manned terrestrial ground vehicles. In some embodiments, the fused sensor data output comprises raster charting or vector charting. In some embodiments, the fused sensor data output comprises a data visualization. In some embodiments, the system further comprises an external display port configured to provide an external display signal. In some embodiments, the system further comprises a hardware or software blackout switch for one or more elements of the system. In some embodiments, the system further comprises a hardware or software GPS orientation switch.

In another aspect, disclosed herein are portable sensor fusion broadcast devices comprising: a case; a display disposed in the case; a communications module disposed in the case and configured to perform at least the following: identify and connect to any of a plurality of communications channels comprising: very small aperture terminal (VSAT) satellite links, cellular networks, serial links, and internet protocol (IP)-based networks; and conduct an automated prioritized failover procedure when the performance of one or more of the communications channels falls below a threshold; a sensor fusion module disposed in the case and configured to perform at least the following: receive sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; log the sensor data in a non-volatile data store; and conduct signal synthesis processing to generate a fused sensor data output; and a broadcast module disposed in the case and configured to perform at least the following: broadcast the sensor data, the fused sensor data output, or both to one or more local or remote push or pull clients through one or more of: the display, a wired connection, and the communications module. In some embodiments, the case is a flight case. In further embodiments, the flight case is a rolling flight case. In a particular embodiment, the case is one-person portable. In some embodiments, the case is weather-resistant and water-resistant. In some embodiments, the case comprises internal shock mounts. In further embodiments, the case comprises an electronic component rack affixed to the shock mounts and the communications module, the sensor fusion module, and the broadcast module are mountable to the rack. In some embodiments, the system further comprises an external VSAT antenna. In further embodiments, the system further comprises an external azimuthing antenna. In further embodiments, the system further comprises an external phased array antenna. In some embodiments, the system further comprises more than one VSAT antenna and utilizes logic to load balance between the multiple antennas. In some embodiments, the system further comprises one or more external cellular antennas. In some embodiments, the system further comprises one or more external GPS antennas. In some embodiments, the system further comprises an external radar antenna. In further embodiments, the system further comprises a module disposed in the case and configured to perform automatic target recognition (ATR) of the radar data. In some embodiments, the display is a color display. In some embodiments, the display is a touch screen. In some embodiments, the display is an e-ink style display.

In some embodiments, the system further comprises a software defined radio (SDR) connected to one or more suitable external antennas. In some embodiments, the system further comprises one or more radio frequency (RF) direction finding systems or modules disposed in the case and configured to intercept, direction find, and record existent RF signals of varying bands. In further embodiments, the system further comprises one or more suitable antennas for the one or more RF direction finding systems or modules. In some embodiments, the system further comprises a cellular broadcast system or module disposed in the case and configured to broadcast a cellular network and allow cellular devices in range to connect. In further embodiments, the system further comprises one or more suitable antennas for the cellular broadcast system or module. In some embodiments, the system further comprises an Automatic Information System (AIS) broadcasting module configured to broadcast marine AIS messages of arbitrary and changeable nature. In further embodiments, the system further comprises one or more antennas suitable for the AIS broadcasting module. In further embodiments, the system further comprises electronic or physical logic to prevent the simultaneous transmission and reception of AIS messages between modules. In some embodiments, the system further comprises one or more external power connections configured to interface to available AC or DC power and provide conversion and/or conditioning to make use of such power. In some embodiments, the system further comprises an uninterruptible power supply (UPS) disposed in the case and supplying power to the display, the communications module, the sensor fusion module, and the broadcast module. In some embodiments, the system further comprises an inertial measurement unit (IMU) disposed in the case. In some embodiments, the system further comprises a rate gyro disposed in the case. In some embodiments, the GPS data comprises single antenna-aided position or dual-antenna RTK position. In some embodiments, the GPS data comprises RTK moving-baseline data from which a heading is be computed. In some embodiments, the system further comprises a power over Ethernet (PoE) supply system disposed in the case. In some embodiments, the system further comprises a network switch disposed in the case and configured to provide power over Ethernet (PoE). In some embodiments, the automated failover procedure is prioritized according to predetermined communications channel attributes. In some embodiments, the one or more vehicles comprise at least one maritime vehicle. In further embodiments, the at least one maritime vehicle comprises one or more unmanned maritime vehicles. In other embodiments, the at least one maritime vehicle comprises one or more manned maritime vehicles. In some embodiments, the one or more vehicles comprise at least one air vehicle. In further embodiments, the at least one air vehicle comprises one or more unmanned air vehicles. In other embodiments, the at least one air vehicle comprises one or more manned air vehicles. In some embodiments, the one or more vehicles comprise at least one terrestrial ground vehicle. In further embodiments, the at least one terrestrial ground vehicle comprises one or more unmanned terrestrial ground vehicles. In other embodiments, the at least one terrestrial ground vehicle comprises one or more manned terrestrial ground vehicles. In some embodiments, the fused sensor data output comprises raster charting or vector charting. In some embodiments, the fused sensor data output comprises a data visualization. In some embodiments, the system further comprises an external display port configured to provide an external display signal. In some embodiments, the system further comprises a hardware or software blackout switch for one or more elements of the system. In some embodiments, the system further comprises a hardware or software GPS orientation switch.

In another aspect, disclosed herein are sensor fusion broadcast methods comprising: identifying a plurality of communications channels selected from the group consisting of: very small aperture terminal (VSAT) satellite links, cellular networks, serial links, and internet protocol (IP)-based networks; connecting to more than one of the plurality of communications channels; conducting an automated prioritized failover procedure when the performance of one or more of the communications channels falls below a threshold; receiving sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; logging the sensor data in a non-volatile data store; conducting signal synthesis processing to generate a fused sensor data output; and broadcasting the sensor data, the fused sensor data output, or both to one or more local or remote push or pull clients through one or more of the connected communications channels. In some embodiments, the method is performed by a self-contained device comprising at least one processor and disposed within a portable case. In further embodiments, the case is a flight case. In still further embodiments, the flight case is a rolling flight case. In some embodiments, the case is one-person portable. In some embodiments, the case is weather-resistant and water-resistant. In some embodiments, the case comprises internal shock mounts. In further embodiments, the case comprises an electronic component rack affixed to the shock mounts and the device is mountable to the rack. In some embodiments, the method further comprises performing automatic target recognition (ATR) of the radar data. In some embodiments, the method further comprises: intercepting existent RF signals of varying bands, direction finding the RF signals, and recording the RF signals. In some embodiments, the method further comprises broadcasting a cellular network and allow cellular devices in range to connect. In some embodiments, the method further comprises broadcasting marine AIS messages of arbitrary and changeable nature. In some embodiments, the GPS data comprises single antenna-aided position or dual-antenna RTK position. In some embodiments, the GPS data comprises RTK moving-baseline data from which a heading is computed. In some embodiments, the automated failover procedure is prioritized according to predetermined communications channel attributes. In some embodiments, the one or more vehicles comprise at least one maritime vehicle. In further embodiments, the at least one maritime vehicle comprises one or more unmanned maritime vehicles. In further embodiments, the at least one maritime vehicle comprises one or more manned maritime vehicles. In some embodiments, the one or more vehicles comprise at least one air vehicle. In further embodiments, the at least one air vehicle comprises one or more unmanned air vehicles. In further embodiments, the at least one air vehicle comprises one or more manned air vehicles. In some embodiments, the one or more vehicles comprise at least one terrestrial ground vehicle. In further embodiments, the at least one terrestrial ground vehicle comprises one or more unmanned terrestrial ground vehicles. In further embodiments, the at least one terrestrial ground vehicle comprises one or more manned terrestrial ground vehicles. In some embodiments, the fused sensor data output comprises raster charting or vector charting. In some embodiments, the fused sensor data output comprises a data visualization.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 1 shows a non-limiting exemplary illustration of a portable sensor fusion broadcast system showing components of the system;

FIG. 2 shows a non-limiting exemplary illustration of a portable sensor fusion broadcast system showing the front panel showing connections; and FIG. 3 shows a non-limiting exemplary schematic illustration showing select modules and systems.

DETAILED DESCRIPTION

Described herein, in certain embodiments, are portable sensor fusion broadcast systems comprising: a case; a display disposed in the case; a communications module disposed in the case and configured to: identify and connect to any of a plurality of communications channels comprising: very small aperture terminal (VSAT) satellite links, cellular networks, serial links, and internet protocol (IP)-based networks; and conduct an automated prioritized failover procedure when the performance of one or more of the communications channels falls below a threshold; a sensor fusion module disposed in the case and configured to: receive sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; log the sensor data in a non-volatile data store; and conduct signal synthesis processing to generate a fused sensor data output; and a broadcast module disposed in the case and configured to broadcast the sensor data, the fused sensor data output, or both to one or more local or remote push or pull clients through one or more of: the display, a wired connection, and the communications module.

Also, described herein, in certain embodiments, are portable sensor fusion broadcast devices comprising: a case; a display disposed in the case; a communications module disposed in the case and configured to perform at least the following: identify and connect to any of a plurality of communications channels comprising: very small aperture terminal (VSAT) satellite links, cellular networks, serial links, and internet protocol (IP)-based networks; and conduct an automated prioritized failover procedure when the performance of one or more of the communications channels falls below a threshold; a sensor fusion module disposed in the case and configured to perform at least the following: receive sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; log the sensor data in a non-volatile data store; and conduct signal synthesis processing to generate a fused sensor data output; and a broadcast module disposed in the case and configured to perform at least the following: broadcast the sensor data, the fused sensor data output, or both to one or more local or remote push or pull clients through one or more of: the display, a wired connection, and the communications module.

Also, described herein, in certain embodiments, are sensor fusion broadcast methods comprising: identifying a plurality of communications channels selected from the group consisting of: very small aperture terminal (VSAT) satellite links, cellular networks, serial links, and internet protocol (IP)-based networks; connecting to more than one of the plurality of communications channels; conducting an automated prioritized failover procedure when the performance of one or more of the communications channels falls below a threshold; receiving sensor data from one or more sensors aboard one or more vehicles, the sensor data comprising one, two, three, four, five, six or all of: global positioning system (GPS) data, GPS-based real-time kinematic (RTK) heading data, radar data, automatic identification system (AIS) data, pitch data, roll data, and magnetic heading data; logging the sensor data in a non-volatile data store; conducting signal synthesis processing to generate a fused sensor data output; and broadcasting the sensor data, the fused sensor data output, or both to one or more local or remote push or pull clients through one or more of the connected communications channels.

The devices and systems herein fuse multiple sensors and communications to allow both coherent situational awareness and ever-present internet access, even in austere and remote environments. The devices and systems herein employ a plurality channels to provide Wide-area Network (WAN) communication to a user. In some embodiments, the devices and systems herein synthesize a plurality sensor types for re-broadcast via network, direct UDP, VPN or serial communication channels. The devices and systems herein are configured to balance the power requirements and availabilities of each of the plurality of communication channels. Further the devices and systems herein provide seamless failover between the plurality of channels based on availably, and without requiring user interaction. In some cases the devices and systems herein are generally configured for the maritime domain.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Portable Sensor Fusion Broadcast Systems and Devices

Provided herein, per FIGS. 1-3 are portable sensor fusion broadcast systems (and devices) comprising: a case; a display disposed in the case; a communications module disposed in the case; a sensor fusion module disposed in the case; and a broadcast module disposed in the case.

In some embodiments, the system further comprises an external VSAT antenna. In further embodiments, the system further comprises an external azimuthing antenna. In further embodiments, the system further comprises an external phased array antenna. In some embodiments, the system further comprises more than one VSAT antenna and utilizes logic to load balance between the multiple antennas. In some embodiments, the system further comprises one or more external cellular antennas. In some embodiments, the system further comprises one or more external GPS antennas. In some embodiments, the system further comprises an external radar antenna. In further embodiments, the system further comprises a module disposed in the case and configured to perform automatic target recognition (ATR) of the radar data.

In some embodiments, the system further comprises a software defined radio (SDR) connected to one or more suitable external antennas. In some embodiments, the system further comprises one or more radio frequency (RF) direction finding systems or modules disposed in the case and configured to intercept, direction find, and record existent RF signals of varying bands. In further embodiments, the system further comprises one or more suitable antennas for the one or more RF direction finding systems or modules.

In some embodiments, the system further comprises a cellular broadcast system or module disposed in the case and configured to broadcast a cellular network and allow cellular devices in range to connect. In further embodiments, the system further comprises one or more suitable antennas for the cellular broadcast system or module. In some embodiments, the system further comprises an Automatic Information System (AIS) broadcasting module configured to broadcast marine AIS messages of arbitrary and changeable nature. In further embodiments, the system further comprises one or more antennas suitable for the AIS broadcasting module. In further embodiments, the system further comprises electronic or physical logic to prevent the simultaneous transmission and reception of AIS messages between modules.

In some embodiments, the system further comprises one or more external power connections configured to interface to available AC or DC power and provide conversion and/or conditioning to make use of such power. In some embodiments, the system further comprises an uninterruptible power supply (UPS) disposed in the case and supplying power to the display, the communications module, the sensor fusion module, and the broadcast module. In some embodiments, the system further comprises an inertial measurement unit (IMU) disposed in the case. In some embodiments, the system further comprises a rate gyro disposed in the case.

In some embodiments, the system further comprises a power over Ethernet (PoE) supply system disposed in the case. In some embodiments, the system further comprises a network switch disposed in the case and configured to provide power over Ethernet (PoE). In some embodiments, the system further comprises an external display port configured to provide an external display signal. In some embodiments, the system further comprises a hardware or software blackout switch for one or more elements of the system. In some embodiments, the system further comprises a hardware or software GPS orientation switch.

Case

An exemplary case 100 is shown in FIG. 1 comprising a weatherproof gasket, a folding handle 115, a latch 120, a shock mounted rack 125, a module 130, and a case end. In some embodiments, the case 100 is configured such that the module 130 is connected to the shock mounted racks 125. In one example the shock mounted rack 125 is a standard 19 inch shock mounted racks 125. In some embodiments, the shock mounted rack 125 reduces and/or eliminates the transfer of external vibrations to the module to prevent damage to the module. In some embodiments, the latch 120 removably attaches the case end to the case. In some embodiments, the latch 120 compresses the case end against the weatherproof gasket to prevent water and moisture from entering the case 100 when the case end is attached to the case. In some embodiments, the latch 120 is configured to be opened and closed by a human hand. In some embodiments, the latch 120 comprises a lock. In some embodiments, the latch 120 comprises any commercially available latch 120 configured for weatherproof or waterproof cases 100. In some embodiments, the folding handle 115 allows the case 100 to be one-man-portable. In some embodiments, the folding handle 115 folds into the profile of the case 100 to prevent damage to the folding handles 115. In some embodiments, the folding handle 115 comprises a spring to ensure that the folding handle 115 is properly folded during storage. The case end is removable from the case 100 to allow access to the connection ports, display screens, hardware, or any combination thereof within the case 100.

In some embodiments, the case 100 comprises 1, 2, 3, 4, 5, 6, 7, 8, 9, 10 or more weatherproof gaskets 110. In some embodiments, the case 100 comprises 1, 2, 3, 4, 5, 6, 7, 8, 9, 10 or more shock mounted racks 125. In some embodiments, the case 100 comprises 1, 2, 3, 4, 5, 6, 7, 8, 9, 10, 12, 14, 16, 18, 20, 25, 30 or more shock latches 120, including increments therein. In some embodiments, the case 100 comprises 1, 2, 3, 4, 5, 6, 7, 8, 9, 10 or more foldable handles 115. In some embodiments, the case 100 comprises 1, 2, 3, 4, 5, 6, 7, 8, 9, 10 or more case ends.

In some embodiments, the case 100 is a flight case, road case, roadie case, or Air Transport Association of America (ATA) case. In some embodiments, the ATA case 100 is configured to comply with ATA Specification 300 category I or II. In further embodiments, the flight case 100 is a rolling flight case. In a particular embodiment, the case 100 is one-person portable. In some embodiments, the case 100 is weather-resistant and water-resistant. In some embodiments, the case 100 comprises internal shock mounts. In further embodiments, the case 100 comprises an electronic component rack 125 affixed to the shock mounts and the communications module, the sensor fusion module, and the broadcast module are mountable to the racks 125. In some embodiments, the flight case 100 is specifically built to protect the contents therein when moved or handle. T In some embodiments, the flight case 100 is a commercially available case.

In some embodiments, the case 100 is fabricated from panels joined by metal or plastic extrusions, molded plastic, or metal. In some embodiments, the case 100 is made from panels having two or more layers, which are laminated together. In some embodiments, at least one of the two or more layers comprises ABS, fiberglass, metal, carbon fiber, ceramic, plywood or any combination thereof. In some embodiments, the plywood comprises a cabinet-grade plywood such as birch, poplar, or maple. In some embodiments, the case 100 comprises an internal shock-absorbing filler. In some embodiments, the filler comprises polyurethane, polyethylene or both. In some embodiments, the case 100 comprises mounting racks 125. In some embodiments, the corners of the case 100 are reinforced with stamped sheet steel case 100 corners, which finished in zinc, nickel, or chrome. In some embodiments, the case 100 comprises casters for ease of transit. In some embodiments, the casters are removable to prevent damage to other containers. In some embodiments, the case 100 comprises a power adapter, a computer fan, or both.

In some embodiments, the case 100 is one-man-portable. One-man-portable is generally defined as being able to be safely carried by only one individual. The one-man-portable case 100 is configured to be safely carried by only one individual for a distance of at least about 10, 20, 30, 40, 50, 60, 70, 80, 90, 100 meters or more, including increments therein. In some embodiments, the one-man-portable case 100 has a weight of at most about 14 kilograms.

In some embodiments, the case 100 further comprises at least one of a wheel, a lock, an identification placard, a bumper, and an identification sticker. In some embodiments, the wheel enables the case 100 to be rolled for transportation. In some embodiments, the case 100 comprises 1, 2, 3, 4, 5, 6, 7, 8 or more wheels.

Control Panel

Per FIG. 2, the control panel comprises at least one of an interface to a satellite modem 210, an interface to an Uninterruptable Power Supply system, and a control/status panel. In some embodiments, the control/status panel comprises a touch screen 200, a cable interface to a VSAT antenna, an interface to an external GPS antenna, a cable interface to an external 3G/4G cellular antenna 205, a cable interface to a ship or a host vehicle mains power, a cable interface to an underlying routing hardware, a cable interface to a power-over-Ethernet switch, a cable interface to a main power rail, a cable interface for an external AIS antenna 215, an Ethernet (PoE) network switch 220, a power switch 235, a blackout switch 230, a GPS orientation switch 225, a SIM card interface, a cable interface for an external input/output I/O 240, an indication lights for the system state, or any combination thereof. In some embodiments, the touch screen 200 enables access to the underlying system, provide diagnostics, display mapping in real-time, or any combination thereof. In some embodiments, the cable interface to the VSAT antenna comprises data, power and coaxial. In some embodiments, the underlying routing hardware comprises an Ethernet USB, a COM, or a USB and a COM. In some embodiments, the GPS orientation switch allows rotational offset, depending on how the antennas are installed.

Communications Module

In some embodiments, the communication module is configured to: identify and connect to any of a plurality of communications channels and conduct an automated prioritized failover procedure. In some embodiments, the plurality of channels comprises: very small aperture terminal (VSAT) satellite links, cellular networks, serial links, and internet protocol (IP)-based networks. In some embodiments, the communication module conducts an automated prioritized failover procedure when the performance of one or more of the communications channels falls below a threshold. In some embodiments, the threshold is a signal quality threshold, a noise quantity threshold, a signal strength threshold, a signal continuity threshold, or any combination thereof. In some embodiments, the automated failover procedure is prioritized according to predetermined communications channel attributes.

Sensor Fusion Module

Per FIG. 3, the sensor fusion module 330 is configured to: receive sensor data from one or more sensors aboard one or more vehicles; log the sensor data; and conduct signal synthesis processing to generate a fused sensor data output. In some embodiments, the sensor fusion module 330 performs overlay data, merging of targets between disparate sensors types and target motion analysis of existing targets. In some embodiments, the sensor fusion module 330 logs the sensor data in a non-volatile data storage. In some embodiments, the sensor data comprises one, two, three, four, five, six or all of: global positioning system (GPS) data, GPS-based real-time kinematic (RTK) heading data 315, radar data 310, automatic identification system (AIS) data 305, pitch/roll data/yaw data 320, a magnetic heading data, an NMEA specified datagram, a raster chart, a vector charting, or any other sensor 325. The sensor data may be received by the sensor fusion module 330 via a sensor module 300. The sensor data may be received by the sensor fusion module 330 via a sensor module 300 and through an internal data network. In some embodiments, the sensor module 300 receives the sensor data from one or more of the sensors aboard one or more vehicles. In some embodiments, the sensor module 300 is integrated into the sensor fusion module 330.

In some embodiments, the pitch/roll data/yaw data 320 comprises at least one of a pitch data, a roll data and a yaw data. In some embodiments, at least one of the system, the module, and the sensor fusion module 300 further comprises an Internal Measurement Unit (IMU). In some embodiments, the IMU collects the pitch/roll data/yaw data 320, the magnetic heading data, or both. In some embodiments, the IMU stores the pitch/roll data/yaw data 320, the magnetic heading data, or both. In some embodiments, the IMU transmits the pitch/roll data/yaw data 320, the magnetic heading data, or both. In some embodiments, at least one of the system, the module, and the sensor fusion module 300 further comprises a non-volatile data storage to receive and store raster charts without an available internet source.

In some embodiments, the GPS data comprises single antenna-aided position or dual-antenna RTK position. In some embodiments, the GPS data comprises RTK moving-baseline data from which a heading is computed. In some embodiments, the fused sensor data output comprises raster charting or vector charting. In some embodiments, the fused sensor data output comprises a data visualization.

Broadcast Module

Further, per FIG. 3, the broadcast module 335 is configured to broadcast the sensor data, the fused sensor data output, or both. In some embodiments, the broadcast module 335 is configured to broadcast the sensor data, the fused sensor data output, or both to one or more local or remote push or pull clients. In some embodiments, the broadcast module 335 is configured to broadcast the sensor data, the fused sensor data output, or both to one or more local or remote push or pull clients through one or more of: the display, a wired connection, and the communications module.

In some embodiments, the broadcast module 335 broadcasts the sensor data, the fused sensor data output, or both via a broadcast channel comprising: very small aperture terminal (VSAT) satellite link 340, a cellular network 345, a wireless local communication device 350, a wired local communication device 355, or any other communication device 360. In some embodiments, the broadcast module 335 conducts an automated prioritized failover procedure when the performance of one or more of the broadcast channels falls below a threshold. In some embodiments, the automated failover procedure is prioritized according to predetermined broadcast channel attributes. In some case the communication module and the broadcast module 335 are interconnected. In some case the communication module and the broadcast module 335 are integrated into a single component.

Display

In some embodiments, the display is a color display. In some embodiments, the display is a touch screen. In some embodiments, the display is an e-ink style display.

Examples of a display include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

Vehicles

In some embodiments, the one or more vehicles comprise at least one maritime vehicle. In further embodiments, the at least one maritime vehicle comprises one or more unmanned maritime vehicles. In other embodiments, the at least one maritime vehicle comprises one or more manned maritime vehicles. In some embodiments, the one or more vehicles comprise at least one air vehicle. In further embodiments, the at least one air vehicle comprises one or more unmanned air vehicles. In other embodiments, the at least one air vehicle comprises one or more manned air vehicles. In some embodiments, the one or more vehicles comprise at least one terrestrial ground vehicle. In further embodiments, the at least one terrestrial ground vehicle comprises one or more unmanned terrestrial ground vehicles. In other embodiments, the at least one terrestrial ground vehicle comprises one or more manned terrestrial ground vehicles.

EXAMPLES

The following illustrative examples are representative of embodiments of the software applications, systems, and methods described herein and are not meant to be limiting in any way.

Example 1

In one example, the communications module identifies and connects to a VSAT satellite link. When the performance of the VSAT satellite link falls below a threshold the communication module performs an automated prioritized failover procedure to disconnect from the VSAT satellite link and to identify and connect to a cellular network. The sensor fusion module then receives a GPS data from one or more sensors aboard one or more vehicles, via the communications module, and logs the sensor data in a non-volatile data store. The sensor fusion module then conducts a signal synthesis process on the GPS data to generate a fused sensor data output. The broadcast module then broadcasts the GPS data and the fused sensor data output via a wired connection.

While preferred embodiments of the present subject matter has been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the subject matter described herein may be employed.

What is claimed is:

1. A portable sensor fusion broadcast system comprising:
   a) a case;
   b) a display disposed in the case;
   c) an external antenna comprising a radar antenna receiving a radar data;
   d) a software defined radio (SDR) connected to one or more external antennas;
   e) an inertial measurement unit (IMU) disposed in the case;
   f) a communications module disposed in the case and configured to perform at least the following:
      i) identify and connect to two or more communications channels comprising: very small aperture terminal (VSAT) satellite links, cellular networks, serial links, and internet protocol (IP)-based networks;
      ii) utilize a logic to load balance between the two or more communication channels; and
      iii) conduct an automated prioritized failover procedure prioritized according to predetermined communications channel attributes when the performance of one or more of the communications channels falls below a threshold;
   g) a sensor fusion module disposed in the case and configured to perform at least the following:
      i) receive sensor data from one or more sensors aboard one or more maritime vehicles, the sensor data comprising the radar data, global positioning system (GPS) data comprising single antenna-aided position or dual-antenna RTK position, and one or more of: automatic identification system (AIS) data, pitch data, roll data, and magnetic heading data;
      ii) log the sensor data in a non-volatile data store;
      iii) perform automatic target recognition (ATR) of the radar; and
      iv) conduct signal synthesis processing to generate a fused sensor data output;
   h) an Automatic Information System (AIS) broadcasting module configured to broadcast a marine AIS message of an arbitrary and changeable nature; and
   i) a broadcast module disposed in the case and configured to perform at least the following: broadcast the sensor data, the fused sensor data output, or both to one or more local or remote push or pull clients through one or more of: the display, a wired connection, and the communications module.

2. The system of claim 1, wherein the case is a flight case.

3. The system of claim 2, wherein the flight case is a rolling flight case.

4. The system of claim 1, wherein the case is one-person portable.

5. The system of claim 1, wherein the case is weather-resistant and water-resistant.

6. The system of claim 1, wherein the case comprises internal shock mounts.

7. The system of claim 6, wherein the case comprises an electronic component rack affixed to the shock mounts and the communications module, the sensor fusion module, and the broadcast module are mountable to the rack.

8. The system of claim 1, further comprising an external VSAT antenna.

9. The system of claim 8, further comprising an external azimuthing antenna.

10. The system of claim 8, further comprising an external phased array antenna.

11. The system of claim 1, further comprising one or more external cellular antennas.

12. The system of claim 1, further comprising one or more external GPS antennas.

13. The system of claim 1, further comprising an external radar antenna.

14. The system of claim 1, wherein the display is a color display.

15. The system of claim 1, wherein the display is a touch screen.

16. The system of claim 1, wherein the display is an e-ink style display.

17. The system of claim 1, further comprising one or more radio frequency (RF) direction finding systems or modules disposed in the case and configured to intercept, direction find, and record existent RF signals of varying bands.

18. The system of claim 17, further comprising one or more suitable antennas for the one or more RF direction finding systems or modules.

19. The system of claim 1, further comprising a cellular broadcast system or module disposed in the case and configured to broadcast a cellular network and allow cellular devices in range to connect.

20. The system of claim 19, further comprising one or more suitable antennas for the cellular broadcast system or module.

21. The system of claim 1, further comprising one or more antennas suitable for the AIS broadcasting module.

22. The system of claim 1, further comprising electronic or physical logic to prevent the simultaneous transmission and reception of AIS messages between modules.

23. The system of claim 1, further comprising one or more external power connections configured to interface to available AC or DC power and provide conversion and/or conditioning to make use of such power.

24. The system of claim 1, further comprising an uninterruptible power supply (UPS) disposed in the case and supplying power to the display, the communications module, the sensor fusion module, and the broadcast module.

25. The system of claim 1, further comprising a rate gyro disposed in the case.

26. The system of claim 1, wherein the GPS data comprises RTK moving-baseline data from which a heading is computed.

27. The system of claim 1, further comprising a power over Ethernet (PoE) supply system disposed in the case.

28. The system of claim 1, further comprising a network switch disposed in the case and configured to provide power over Ethernet (PoE).

29. The system of claim 1, wherein the at least one maritime vehicle comprises one or more unmanned maritime vehicles.

30. The system of claim 1, wherein the at least one maritime vehicle comprises one or more manned maritime vehicles.

31. The system of claim 1, wherein the one or more vehicles comprise at least one air vehicle.

32. The system of claim 31, wherein the at least one air vehicle comprises one or more unmanned air vehicles.

33. The system of claim 31, wherein the at least one air vehicle comprises one or more manned air vehicles.

34. The system of claim 1, wherein the fused sensor data output comprises raster charting or vector charting.

35. The system of claim 1, wherein the fused sensor data output comprises a data visualization.

36. The system of claim 1, further comprising an external display port configured to provide an external display signal.

37. The system of claim 1, further comprising a hardware or software blackout switch for one or more elements of the system.

38. The system of claim 1, further comprising a hardware or software GPS orientation switch.

39. A portable sensor fusion broadcast device comprising:
a) a case;
b) a display disposed in the case;
c) an external antenna comprising a radar antenna receiving a radar data;
d) a software defined radio (SDR) connected to one or more external antennas;
e) an inertial measurement unit (IMU) disposed in the case;
f) a communications module disposed in the case and configured to perform at least the following:
  i) identify and connect to two or more communications channels comprising: very small aperture terminal (VSAT) satellite links, cellular networks, serial links, and internet protocol (IP)-based networks;
  ii) utilize a logic to load balance between the two or more communication channels; and
  iii) conduct an automated prioritized failover procedure prioritized according to predetermined communications channel attributes when the performance of one or more of the communications channels falls below a threshold;
g) a sensor fusion module disposed in the case and configured to perform at least the following:
  i) receive sensor data from one or more sensors aboard one or more maritime vehicles, the sensor data comprising the radar data, global positioning system (GPS) data comprising single antenna-aided position or dual-antenna RTK position, and one or more of: automatic identification system (AIS) data, pitch data, roll data, and magnetic heading data;
  ii) log the sensor data in a non-volatile data store;
  iii) perform automatic target recognition (ATR) of the radar; and
  iv) conduct signal synthesis processing to generate a fused sensor data output;
h) an Automatic Information System (AIS) broadcasting module configured to broadcast a marine AIS message of an arbitrary and changeable nature; and
i) a broadcast module disposed in the case and configured to perform at least the following: broadcast the sensor data, the fused sensor data output, or both to one or more local or remote push or pull clients through one or more of: the display, a wired connection, and the communications module.

40. A sensor fusion broadcast method performed at a portable sensor fusion broadcast system comprising a case containing components comprising a communications module, a sensor fusion module, and a broadcast module, the method comprising:
a) identifying, by the communications module, two or more communications channels selected from the group consisting of: very small aperture terminal (VSAT) satellite links, cellular networks, serial links, and internet protocol (IP)-based networks;
b) connecting, by the communications module, to more than one of the plurality of communications channels;
c) utilizing, by the communications module, a logic to load balance between the two or more communication channels;
d) conducting, by the communications module, an automated prioritized failover procedure prioritized according to predetermined communications channel attributes when the performance of one or more of the communications channels falls below a threshold;
e) receiving, by the sensor fusion module, sensor data from one or more sensors aboard one or more maritime vehicles, the sensor data comprising the radar data, global positioning system (GPS) data comprising single antenna-aided position or dual-antenna RTK position, and one or more of: automatic identification system (AIS) data, pitch data, roll data, and magnetic heading data;
f) logging, by the sensor fusion module, the sensor data in a non-volatile data store;
g) performing, by the sensor fusion module, automatic target recognition (ATR) of the radar;
h) conducting, by the sensor fusion module, signal synthesis processing to generate a fused sensor data output; and
i) broadcasting, by the broadcast module, a marine AIS message of an arbitrary and changeable nature; and
j) broadcasting, by the broadcast module, the sensor data, the fused sensor data output, or both to one or more local or remote push or pull clients through one or more of the connected communications channels.

* * * * *